United States Patent [19]

Bobo et al.

[11] Patent Number: 5,169,240

[45] Date of Patent: * Dec. 8, 1992

[54] PROPORTIONED PISTON RING SEALS

[75] Inventors: Melvin Bobo; Adam N. Pope, both of Cincinnati, Ohio

[73] Assignee: General Electric Company, Cincinnati, Ohio

[*] Notice: The portion of the term of this patent subsequent to Apr. 21, 2009 has been disclaimed.

[21] Appl. No.: 826,561

[22] Filed: Jan. 27, 1992

Related U.S. Application Data

[62] Division of Ser. No. 686,445, Apr. 17, 1991, Pat. No. 5,106,208.

[51] Int. Cl.$^5$ .................. F16C 27/00; F16C 39/04; B21D 53/10
[52] U.S. Cl. ..................... 384/99; 29/898.1; 384/581
[58] Field of Search ............... 384/99, 535, 581; 29/898.1

[56] References Cited

U.S. PATENT DOCUMENTS

| | | | |
|---|---|---|---|
| 4,046,430 | 9/1977 | Buono et al. | 384/99 |
| 4,114,959 | 9/1978 | Christ | 308/3.5 |
| 4,213,661 | 7/1980 | Marmol | 384/99 |
| 4,337,983 | 7/1982 | Hibner | 308/26 |
| 4,392,751 | 7/1983 | Ida et al. | 384/99 |
| 4,404,724 | 9/1983 | Christ et al. | 29/116 |
| 4,527,912 | 7/1985 | Klusman | 384/99 |
| 4,634,297 | 1/1987 | Schriwer | 384/100 |
| 4,669,893 | 6/1987 | Chalaire et al. | 384/99 |
| 4,783,179 | 11/1988 | Katayama et al. | 384/130 |

OTHER PUBLICATIONS

Experimental Measurement of the Dynamic Force Response of a Squeeze-Film Bearing Damper, by John M. Vance-Transactions of the ASME, Nov. 1975, pp. 1282-1290.

Primary Examiner—Thomas R. Hannon
Attorney, Agent, or Firm—Jerome C. Squillaro; John R. Rafter

[57] ABSTRACT

A squeeze film damper assembly includes a piston ring and groove seal combination. The piston ring is proportioned with respect to its groove to generate a pressure wave in an annular ring space which closely approximates the pressure generate in the annular squeeze film space, thereby improving piston ring sealing. The radial dimension of the ring space is matched to the radial dimension of the squeeze film space. The assembly can include channels interconnecting the squeeze film space and ring space at corresponding angular positions in the annular spaces, with means for restricting circumferential flow between the angular positions.

8 Claims, 4 Drawing Sheets

PROPORTIONED PISTON RING SEALS

This application is a division of application Ser. No. 07/686,445, filed Apr. 17, 1991, now U.S. Pat. No. 5,106,208.

This patent application is related to, and cross references, previously filed patent application Squeeze Film Damper Fluid Control, Ser. No. 07/610,199, U.S. Pat. No. 5,071,262 by Monzel et al., and assigned to the assignee of the current invention.

BACKGROUND OF THE INVENTION

This invention relates to improved piston ring sealing in squeeze film dampers and, more particularly, to means for improved distribution of fluid pressures in significant regions of piston ring seals in squeeze film dampers.

Squeeze film dampers are employed in gas turbine engines to damp vibratory motion, and generally include a bearing support member, such as the outer annular race of a rolling element bearing, which is fitted into an annular chamber in a bearing housing in which it is permitted to have some limited radial motion. The annular bearing race fits closely in the annular chamber to define a thin annular squeeze film space between the outer circumferential surface of the race and an opposing circumferential chamber wall. Damper fluid, such as oil under pressure, is supplied to the squeeze film space to provide viscous damping and limit radial motion of the shaft and race, which move as a unit.

A pair of axially spaced apart piston ring seals are fitted in grooves in the outer bearing race to engage the opposing chamber wall and seal off the defined squeeze film space therebetween. Each piston ring seated in its groove defines an annular ring space between a radially inward facing surface on the piston ring and a radially outward facing surface of the groove. Fluid pressure in the ring space may be used to pressurize the piston ring against the opposing housing wall to seal the squeeze film space.

Any radial motion of the annular bearing race in the chamber generates a very high fluid pressure in the annular squeeze film space and viscous flow of the oil therein. Such motion also results in movement of the piston rings in their grooves and generates a pressure wave in the ring spaces. During engine operation, rotor shaft imbalance may cause the shaft and race to have some orbiting motion within the housing chamber, thereby creating circumferentially traveling fluid pressure waves with high and low pressure regions in the squeeze film space and the ring space. The squeeze film pressure wave produces a viscous flow which provides beneficial damping of the rotor shaft motion.

In prior designs, the radial dimension, or gap height, of the ring spaces is typically substantially greater than the radial dimension, or gap height, of the squeeze film. Typically, the squeeze film radial height may be between 5-12 mils (0.005 inch-0.012 inch). In known prior designs the ring space radial height is at least two times the squeeze film height. The magnitude of the pressure wave generated in the ring space is therefore much lower than that of the pressure wave in the squeeze film, because for a given motion of the outer race, the percentage volume change of the ring space is smaller than the corresponding percentage volume change of the squeeze film at a given circumferential location. Ideally, the pressure in the ring space should equal the pressure in the squeeze film at any given circumferential location to ensure sealing of the piston ring against the opposing housing wall. Pressure imbalance between the squeeze film and the ring space at a given circumferential location can result in unseating of the piston rings and damper fluid leakage, with attendant loss of damper effectiveness.

Prior designs provide a circumferentially extending vent space for fluid pressure communication between the squeeze film and the ring space. However, applicants believe the vent space diminishes damper effectiveness because it also provides a circumferential flowpath from the high pressure region in the squeeze film pressure wave to the low pressure region in the squeeze film pressure wave, thereby dissipating the magnitude of the pressure wave in the squeeze film. The vent space may also permit excessive axial motion of the piston rings under certain operating conditions, resulting in leakage.

OBJECTS OF THE INVENTION

Accordingly, an object of this invention is to provide improved fluid pressure transmission and distribution between a squeeze film space and adjacent ring spaces in a squeeze film damper.

Another object of this invention is to proportion a piston ring and its groove to generate a traveling pressure wave in the ring space which closely approximates the traveling pressure wave generated in the adjacent squeeze film space, so as to minimize the flow between the squeeze film and ring spaces required to ensure proper pressure distribution in the squeeze film and ring spaces at each angular position around the bearing.

It is another object of this invention to provide improved fluid pressure distribution on piston ring seals in squeeze film dampers for improved piston ring sealing.

Still another object of this invention is to provide circumferentially spaced-apart radial fluid pressure passages or channels between the squeeze film space and adjacent ring spaces in a squeeze film damper.

SUMMARY OF THE INVENTION

A damper bearing assembly is provided in which the piston rings and the grooves in which they are seated are proportioned to generate a pressure wave adjacent the piston rings which closely approximates the pressure wave in the squeeze film. The radial dimension of the ring spaces can be proportioned to closely equal the radial dimension of the squeeze film space between the outer race and the housing chamber wall. Due to this matching, radial motion of the outer race with respect to the opposing housing wall and the associated radial motion of the piston rings in their grooves will, at a given circumferential location, generate approximately equal pressure changes in the squeeze film and ring spaces. Thus, the pressure waves generated in the ring spaces will closely approximate the pressure wave generated in the squeeze film.

In addition, radially extending, circumferentially spaced-apart channels can be provided between a squeeze film space and the ring spaces to more directly interrelate the circumferentially traveling wave in the squeeze film with the corresponding traveling wave in the ring spaces. The passages restrict circumferential flow from the high to low pressure regions in the squeeze film pressure wave, while providing fluid pressure communication between the squeeze film space and the ring spaces at a given circumferential location for improved piston ring sealing.

DESCRIPTION OF PREFERRED EMBODIMENTS

Figure 1:
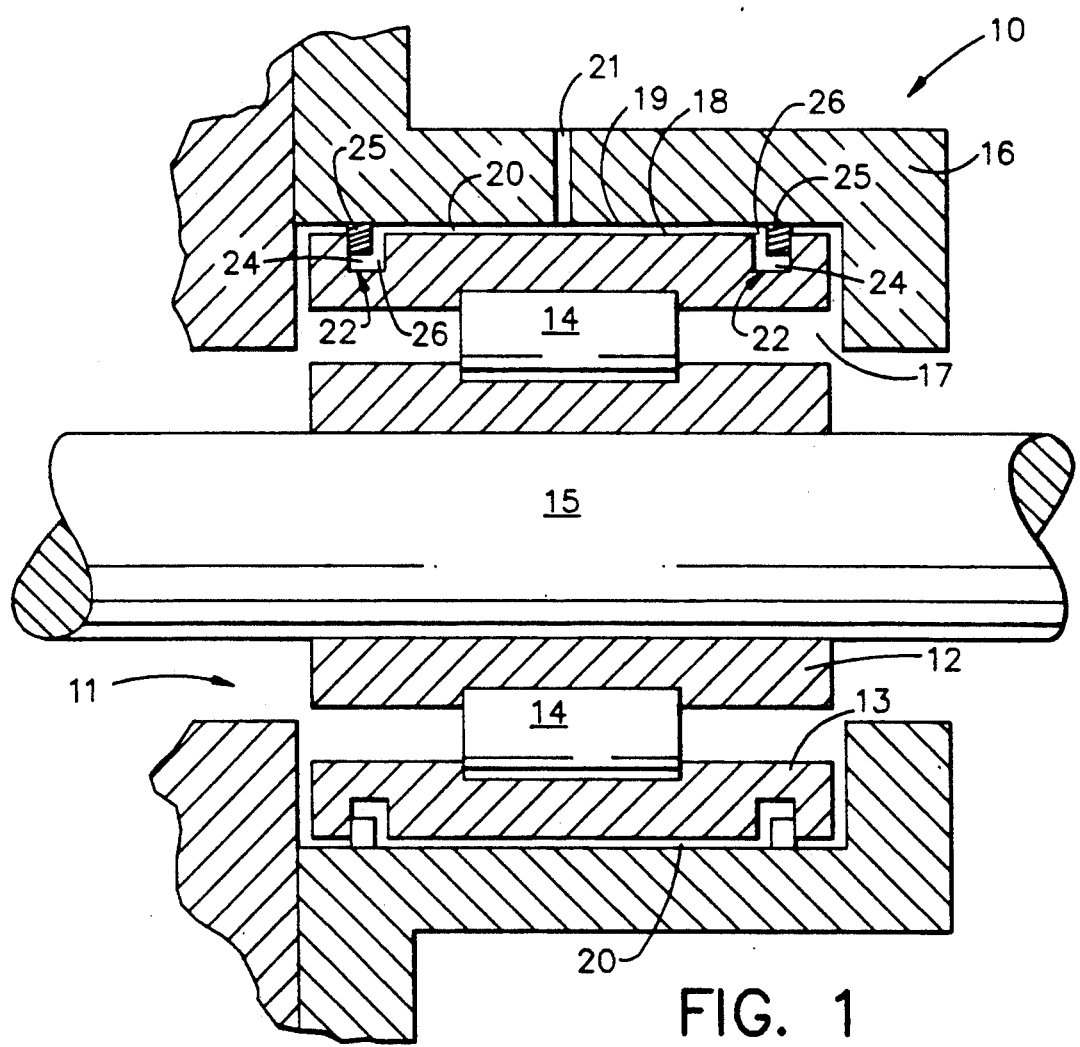
FIG. 1 is a partial schematic illustration of a known squeeze film damper.
Figure 2A:
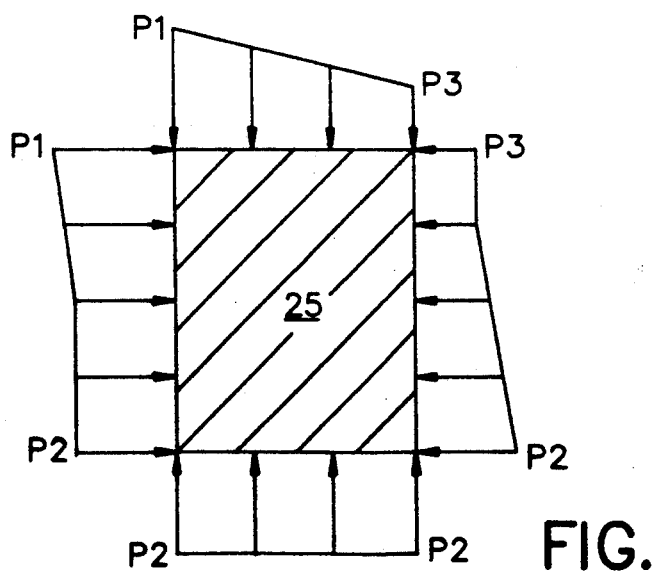
FIG. 2a is an illustration of a pressure distribution around a piston ring.
Figure 2:
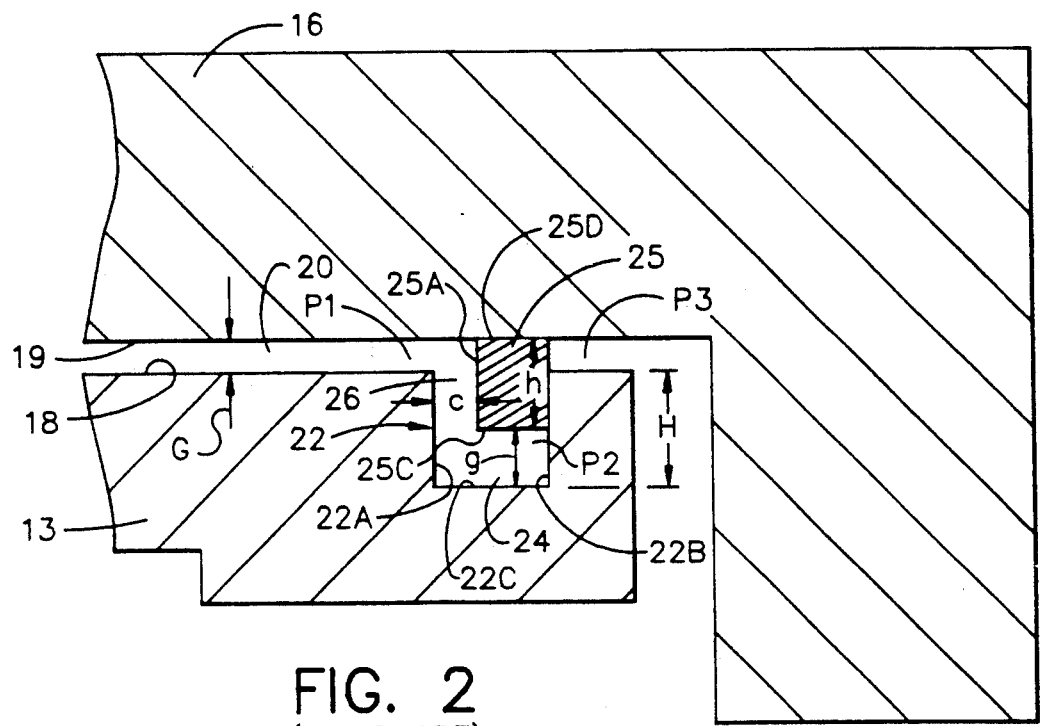
FIG. 2 is an enlarged view of the squeeze film and ring space shown in FIG. 1.

FIGS. 1 and 2 show a known squeeze film damper assembly 10 including a known roller bearing assembly 11 used with a turbine rotor shaft 15 in a gas turbine engine. Bearing assembly 11 comprises an inner race 12 and a spaced outer bearing support member in the form of an outer annular race 13 with rolling elements 14 therebetween. Inner race 12 is fitted on rotor shaft 15 so that inner race 12 rotates, with shaft 15, on rolling elements 14.

A supporting housing 16 for bearing assembly 11 includes an annular chamber 17. Outer race 13 is positioned in annular chamber 17 for limited radial motion therein. The outer circumferential surface 18 of annular race 13 is closely adjacent the inner circumferential surface 19 of annular chamber 17 to define a thin annular squeeze film space 20 therebetween having a radial gap height G (FIG. 2). The gap represented by G varies around the circumference of the damper during motion of race 13 within chamber 17 (it is to be understood that G refers to the nominal gap height when race 13 is centered concentrically in chamber 17). Damper fluid, such as oil under pressure, is introduced from a pressurized supply (not shown) into squeeze film space 20 through one or more inlets 21 to damp motion of race 13 in chamber 17.

Rotor shaft imbalance or other forces may cause detrimental vibration of shaft 15. The resulting orbital motion of bearing assembly 11 in chamber 17 alternately compresses and expands the gap represented by G, creating a circumferentially traveling pressure wave with high and low pressure regions in squeeze film space 20, as well known by those skilled in the art. The resulting viscous flow of damper oil in the squeeze film damps the shaft vibration.

In order to seal damper oil in space 20, axially spaced-apart grooves 22 are disposed in outer surface 18 of race 13 and extend circumferentially around race 13. Referring to FIG. 2, grooves 22 are of generally rectangular cross section having axially spaced-apart inner and outer planar sidewalls 22A and 22B, and a radially outwardly facing cylindrical surface 22C. Inner side wall 22A is adjacent squeeze film space 20. A piston ring seal 25 is fitted in each groove 22 to radially move into peripheral sealing engagement with opposite circumferential chamber wall 19. Piston rings 25 includes inner and outer sidewalls 25A and 25B, as well as inner and outer radial faces 25C and 25D. Piston ring inner radial face 25C and groove surface 22C define an annular ring space 24 having a nominal radial gap height g. The gap represented by g also varies around the circumference of the bearing with motion of race 13 in chamber 17.

The known design uses damper oil under pressure from squeeze film space 20 to assist in piston ring sealing. FIG. 2 shows P1, P2, and P3 representing the squeeze film pressure, the ring space pressure, and the external sump pressure, respectively, at a given circumferential location around the bearing. The pressure distribution on a piston ring is shown in FIG. 2a. Those skilled in the art use known bearing oil supply characteristics to ensure that squeeze film pressure P1 is greater than sump pressure P3 at any circumferential location around the bearing, so that piston ring 25 is seated against groove sidewall 22B.

P2 should closely approximate P1 at each angular location for radial sealing of piston ring 25 against opposing wall 19. As shown in FIG. 2a, pressure P2 on piston ring face 25C acts to seat piston ring 25 against wall 19, while the average of P1 and P3 act on piston ring face 25D to unseat ring 25. Thus, radial sealing of piston ring 25 against wall 19 is enhanced if P2 is matched to P1.

Gap g in ring space 24 is much larger than squeeze film gap G in known prior art designs. Gap G is typically 5 to 12 mils (0.005 to 0.012 inch), while ring space gap g is at least two times G. For example, a known prior design has a nominal squeeze film gap G of 11.25 mils (0.01125 inch) and a nominal ring space gap g of 28.25 mils (0.02825 inch).

Applicants have found that due to the large differences between g and G, motion of outer race 18 relative to wall 19 causes a greater percentage change in the volume of the squeeze film than in the ring space. As a result, the circumferentially traveling pressure wave generated in ring space 24 will have a lower magnitude than the pressure wave generated in squeeze film 20 in prior known designs.

In addition, the known design in FIGS. 1 and 2 uses a circumferentially continuous vent space 26 to provide fluid communication between ring space 24 and squeeze film 20. The purpose of the vent space 26 is to permit flow between ring space 24 and squeeze film 20 to equalize P2 with respect to P1. The axial width c (FIG. 2) of vent 26 is sized to provide the required flow to equalize P2 and P1 for a particular bearing application, and is typically between 2 to 10 mils in prior art designs.

Applicants have determined that vent space 26 is undesirable for a number of reasons. The radial height of vent 26 at any circumferential location is the sum of the groove radial height H and the squeeze film radial gap height at that location. Since vent space 26 is circumferentially continuous, motion of race 13 in chamber 17 results in a relatively small percentage volume change in the vent 26 compared to the percentage volume change of the squeeze film, and the magnitude of the pressure wave generated in vent 26 is small compared to the magnitude of the pressure wave generated in squeeze film 20.

Also, because vent space 26 is circumferentially continuous it provides not only a radial flow path from squeeze film 20 to ring space 24, but also a circumferential flow path from the high pressure region in the squeeze film pressure wave to the low pressure region in the squeeze film pressure wave. As a result, the magnitude of the pressure wave in the squeeze film 20 will be diminished, and damper effectiveness will be reduced.

Vent space 26 may also permit excessive axial motion of piston ring 25 within groove 22. Though the bearing oil supply is typically designed so that P1 is greater than P3, certain pressure conditions may act to unseat piston ring 25 from groove side wall 22B. Irregularities on side wall 22B may also unseat piston ring 25. Under such conditions, vent space axial width c permits axial motion of ring 25 toward side wall 22A, resulting in oil leakage from ring space 24. Therefore, it is desirable to minimize vent space axial width c to the extent possible, while still permitting radial motion of ring 25 in groove 22.

Figure 3:
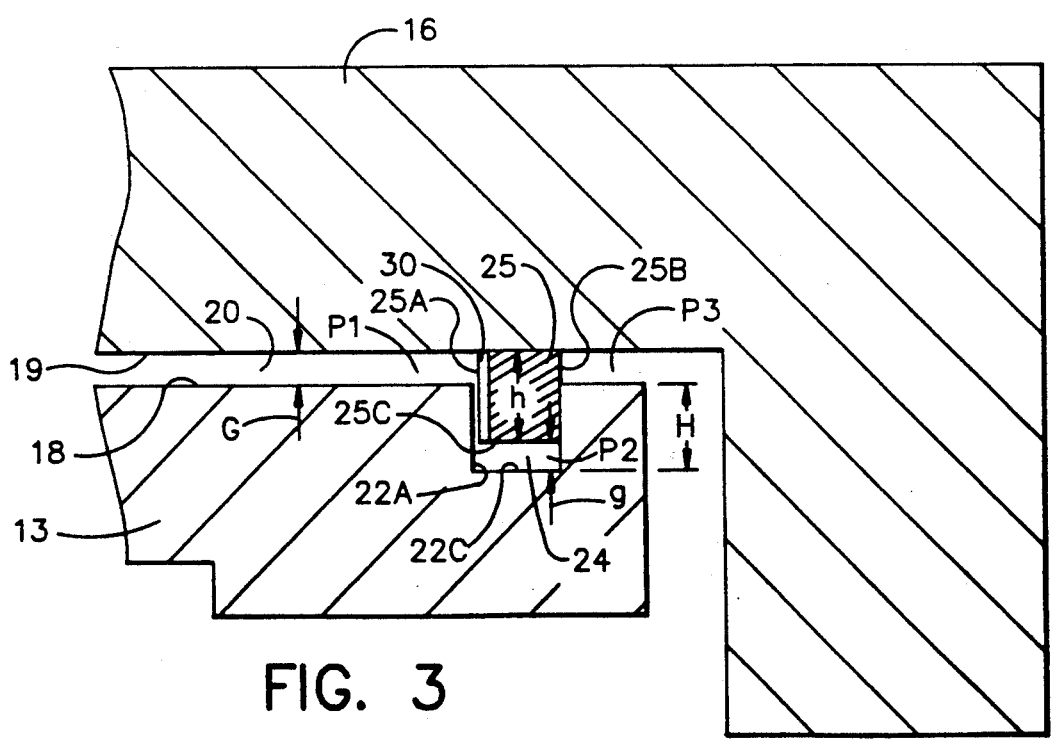
FIG. 3 is a partial schematic illustration of a squeeze film space, piston ring, and ring space in accordance with the present invention.
Figure 4:
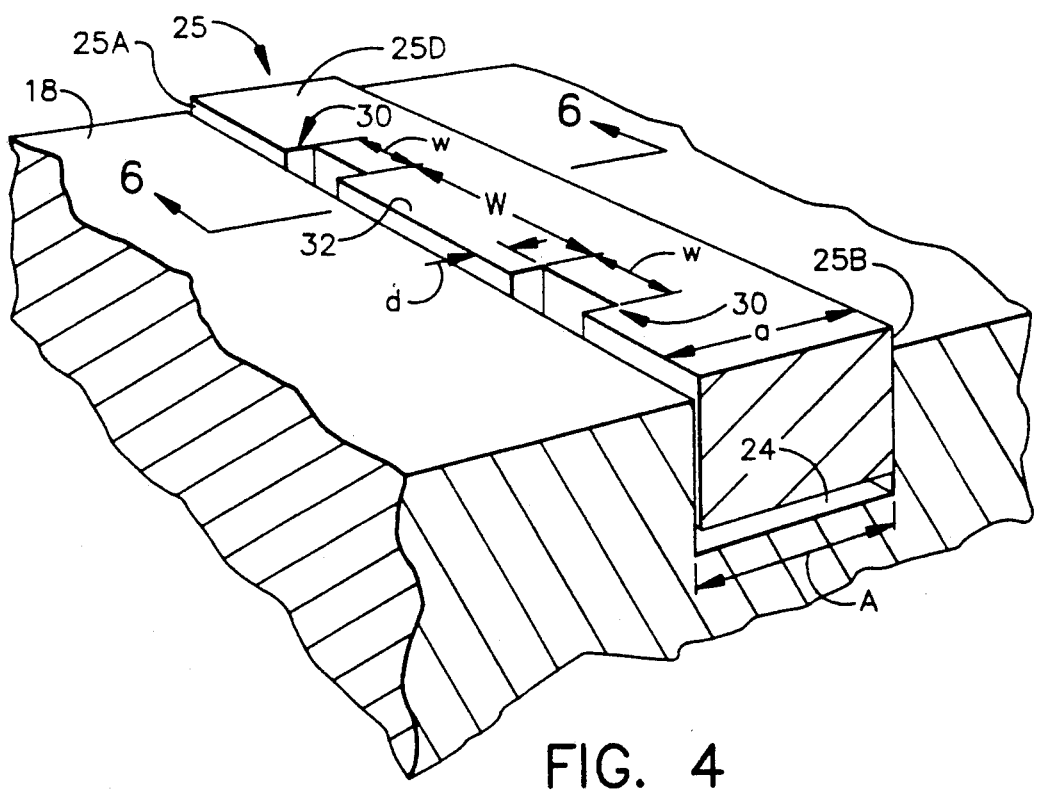
FIG. 4 is a schematic perspective view of a section of a piston ring seal with radial flow passages in a piston ring sidewall in accordance with the present invention.

FIGS. 3 and 4 show a preferred embodiment of the present invention. In each piston ring and groove combination, the piston ring 25 is proportioned with respect to its groove 22 to generate a pressure wave in ring space 24 that closely approximates the pressure wave generated in squeeze film space 20. Applicants have determined that by sizing ring space gap height g to closely approximate squeeze film gap height G, the percentage change in volume of the ring space will closely match the percentage change in volume of the squeeze film for motion of race 13 within chamber 17. Thus, the pressure wave generated in ring space 24 will closely approximate the pressure wave generated in squeeze film space 20. The ring space gap height g is preferably sized to equal squeeze film gap height G to the extent possible, taking into consideration machining and manufacturing tolerances and variations. Matching of gap g with gap G can be accomplished by sizing the radial dimension h of piston ring 25 to match the radial dimension H of groove 22, taking into consideration dimensional stack-up of the assembly. The tolerances and stack-ups will vary with different bearing configurations, and can be calculated by those skilled in the art of mechanical design for any particular configuration.

Generating approximately equal pressure waves in squeeze film space 20 and ring spaces 24 by matching gaps g and G will reduce the amount of flow required between space 20 and ring spaces 24 for close correlation between P2 and P1. Therefore, a circumferentially continuous vent space 26 is not required.

The above-mentioned tolerances, as well as viscosity, temperature, and other effects in the squeeze film and ring spaces will prevent exact matching of the pressure waves in practice. However, matching of pressures P1 and P2 at any given circumferential location can be further refined, or trimmed, by providing a plurality of circumferentially spaced-apart and radially extending channels 30 (FIG. 4), disposed in piston ring sidewall 25A. Channels 30 interconnect the pressures waves in squeeze film 20 and ring space 24 to ensure that the magnitude and shape of the pressure wave generated in ring space 24 closely approximates the pressure wave in the squeeze film 20 at any circumferential location.

Channels 30 are preferably uniformly spaced around the ring 25, and provide radial pressure communication between squeeze film 20 and ring space 24 at circumferentially spaced-apart positions. Adjacent channels 30 having circumferential width w are separated by stand-offs 32 having width W. The stand-offs restrict circumferential flow between adjacent channels, so that channels 30 do not provide a circumferential flow path between the squeeze film high and low pressure regions. Thus, pressure, waves in the squeeze film and ring spaces can be further equalized by radial pressure communication between ring space 24 and squeeze film 20 without diminishing the magnitude of the pressure wave in the squeeze film.

A large number of channels 30 will provide a smoother matching of the pressure waves in the squeeze film and ring spaces. A large number of channels with a small width w are preferred over a relatively small number of channels with a large width w. Preferably, a number of channels with a channel width w less than or equal to stand-off width W are uniformly spaced on ring side wall 25A, thereby providing a circumferentially smooth matching of the pressure waves, yet still restricting circumferential flow within individual channels. Piston ring axial width a (FIG. 4) should be proportioned for the minimum clearance in axial groove width A which permits radial motion of ring 25 in groove 22.

In one embodiment where the bearing chamber 17 has an inner diameter at surface 19 of approximately eight inches, piston ring 25 has a radial height h of approximately 0.115 inch, and an axial width a of approximately 0.135 inch, or about 1.2 times h. Each groove 22 and piston ring 25 are preferably proportioned so that squeeze film gap G and ring space gap g are equal within the machining and stack-up tolerances discussed above. Depending on bearing damping requirements, the gaps G and g may be between 5 and 12 mils (0.005 to 0.012 inch). For example, for a nominal squeeze film gap G of 11.25 mils (0.01125 inch), the nominal ring space gap g is sized at 11.75 mils (0.01175 inch), or less than five percent greater than the squeeze film gap G. The ring space gap is sized slightly larger than the squeeze film space gap so that the above mentioned tolerances and stack-up do not result in chamber wall 19 bottoming out on the piston rings 25 in extreme operating conditions.

In a preferred embodiment, twenty-four channels 30 may be uniformly spaced at approximately 15 degree intervals around piston ring side wall 25A, with widths W and w equal, so that width w does not extend circumferentially through more than about 7.5 degrees. The axial depth d (FIG. 4) of channels 30 is sized to provide a radial flow area which is at least 5 times the radial flow area provided by the axial clearance between piston ring 25 and groove 22. Groove axial width A and piston ring axial width a are sized to provide a nominal axial clearance of about 0.7 mils (0.0007 inch), while the axial depth d of channels 30 is approximately 7 mils (0.007 inch), or ten times the axial clearance of the piston ring within its groove. Since channel circumferential width w equals stand-off width W, the radial flow area through all the channels 30 is 5 times the radial flow area through the axial clearance between piston ring 25 and groove 22.

As a result, if piston ring 25 is unseated from slot wall 22B, the radial flow area through channels 30 from squeeze film 20 to ring space 24 will be 5 times the flow area through the axial clearance from ring space 24 to the external sump pressure P3. Since pressure drop is inversely proportional to the square of flow area, the pressure drop from squeeze film 20 to ring space 24 will be 1/25 the pressure drop from ring space 24 to the pressure P3 in the sump. Thus, even in the extreme case of unseating of piston ring 25 from sidewall 22B, the applicants have found that by providing properly proportioned channels 30 the pressure in ring space 24 can be closely matched to the pressure in squeeze film 20.

Figure 5:
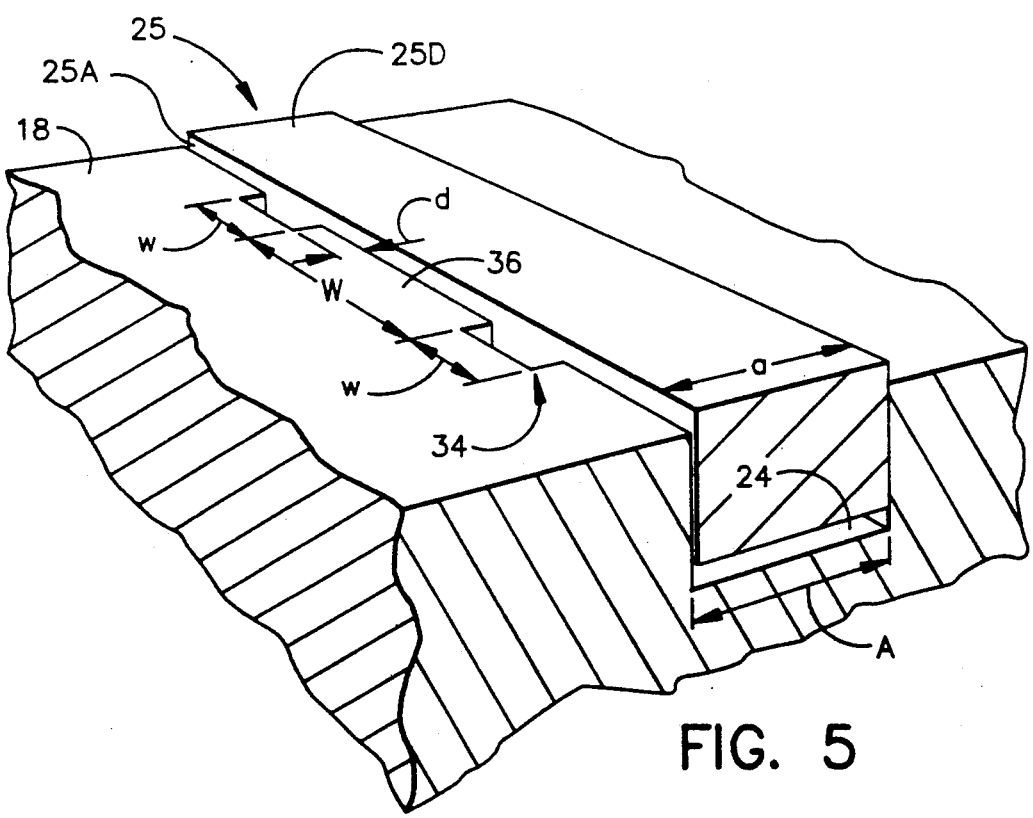
FIG. 5 is a schematic perspective view of a section of a piston ring seal with radial flow passages in a groove wall in accordance with an alternative embodiment of the present invention.

FIG. 5 shows an alternative embodiment wherein piston ring sidewall 25A is generally flat and channels 34 are disposed in groove sidewall 22A. Channels 34 are spaced-apart circumferentially by stand-offs 36, and provide radial fluid pressure communication between squeeze film 20 and ring space 24, as described above.

Figure 6A:
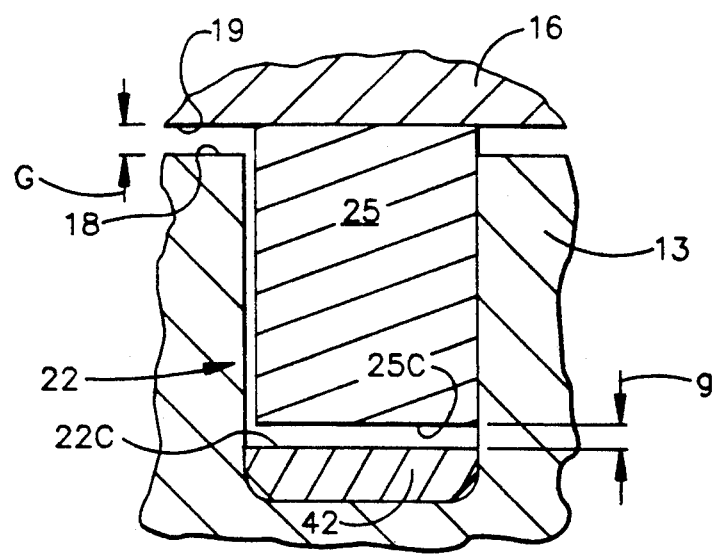
FIGS. 6a, 6b, and 6c are illustrations of cross sections of alternative embodiments of a piston ring and groove combination taken along 6—6 in FIG. 4.
Figure 6B:
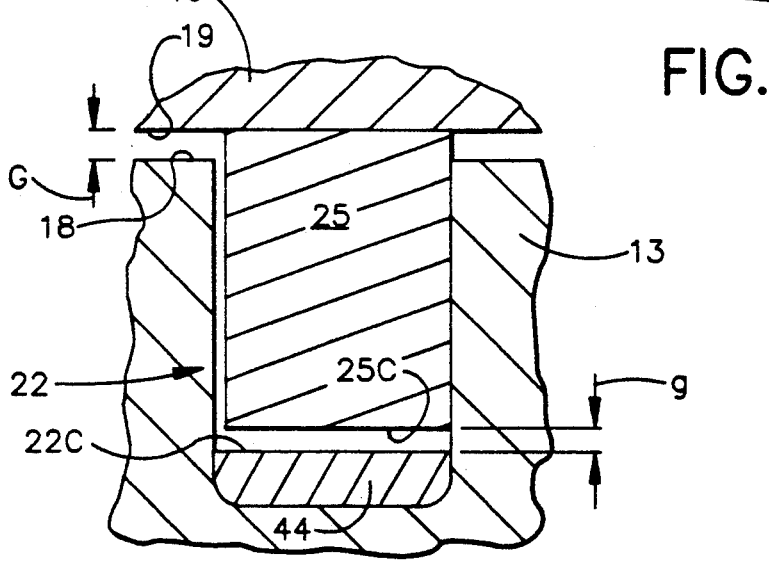
Figure 6C:
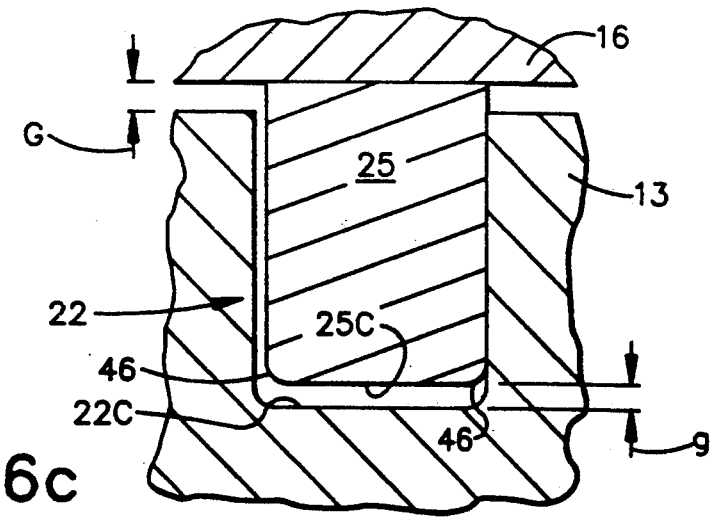

FIGS. 6a, 6b, and 6c show three alternative embodiments for providing a uniform ring space gap g across the full axial width of piston ring 25. Milling machine cutting tools will generally leave a radius at the internal corners of groove 22, so that gap g at the edges of the groove surface 22c may be smaller than gap g at the center of the groove. It is desirable to provide uniform spacing between piston ring face 25C and groove surface 22C across the full axial width of piston ring 25 for more precise matching of the pressure wave in ring space 24 with the pressure wave in squeeze film 20. In FIG. 6a a seam welded sleeve 42 is disposed in the groove to provide a uniform gap g across the width of piston ring 25. In FIG. 6b, brazed filler material 44 is disposed in groove 22 to provide a generally uniform gap across the width of piston ring 25. In a preferred embodiment shown in FIG. 6c, inner edges 46 of piston ring 25 have a radius sized with respect to the radius of the groove internal corners, so as to providing a generally uniform gap g across the width of piston ring 25. The radius of ring inner edges 46 may be sized slightly larger than the radius of the internal groove corners in order to ensure clearance between the ring and groove. For instance, for the embodiment described above, the radius of the ring inner edges 46 may be about 20 mils, while the radius at the edges of groove surface 22C may be about 18 mils.

While the invention has been disclosed and described with respect to preferred embodiments, it will be understood by those skilled in the art that various changes and modifications may be made without departing from the spirit and scope of the invention recited in the following claims.

We claim:

1. A squeeze film damper bearing assembly for use in a gas turbine engine, the assembly comprising:
   a) a bearing support member disposed for rotation within a bearing housing chamber wall and defining a fluid filled annular squeeze film space therebetween;
   b) a groove disposed in the bearing support member;
   c) a ring disposed in the groove for sealing the squeeze film space, the ring and groove combination defining a fluid filled annular ring space adjacent the ring; and
   d) a plurality of circumferentially spaced-apart channels providing fluid communication between the ring space and the squeeze film space.

2. The bearing assembly recited in claim 1, wherein the channels are formed in a ring sidewall.

3. The bearing assembly recited in claim 1, wherein the channels are formed in a groove sidewall.

4. The bearing assembly recited in claim 1, wherein adjacent channels are uniformily spaced apart by stand-offs, and wherein the channels have a circumferential width w which is less than or equal to a circumferential width W of the stand-offs.

5. The bearing assembly as recited in claim 1, wherein the adjacent channels are uniformily spaced apart and extend circumferentially through an angle which is less than or equal to about 7.5 degrees.

6. The bearing assembly as recited in claim 1, wherein each channel has an axial depth d, and wherein the ring is fitted in its respective groove with an axial clearance which is less than the channel depth d.

7. The bearing assembly as recited in claim 6, wherein the adjacent channels are uniformily spaced apart by stand-offs, and wherein the channels have a circumferential width w which is less than or equal to a circumferential width W of the stand-offs.

8. The bearing assembly as recited in claim 1, wherein the ring is fitted in its respective groove with an axial clearance therebetween which provides a radial flow area no more than about one-fifth of the combined radial flow areas of the channels.

* * * * *